(12) United States Patent
Wu et al.

(10) Patent No.: US 6,199,810 B1
(45) Date of Patent: Mar. 13, 2001

(54) FLAT-PANEL DISPLAY ASSEMBLY MOUNTABLE IN A VEHICLE

(75) Inventors: Sheng Hsien Wu; Keiji Maruta, both of Taoyuan Hsien (TW)

(73) Assignee: Sony Video Taiwan, Co., Ltd. (TW)

( * ) Notice: Subject to any disclaimer, the term of this patent is extended or adjusted under 35 U.S.C. 154(b) by 0 days.

(21) Appl. No.: 09/170,592

(22) Filed: Oct. 13, 1998

(30) Foreign Application Priority Data

Oct. 14, 1997 (TW) ................................................ 86115274

(51) Int. Cl.⁷ ........................................................ E04G 3/00
(52) U.S. Cl. .................... 248/291.1; 248/919; 248/923; 307/10.1
(58) Field of Search ................................ 248/291.1, 919, 248/292.13, 917, 922, 923; 361/725, 726, 727; 307/9.1, 10.1; 16/270

(56) References Cited

U.S. PATENT DOCUMENTS

| | | | |
|---|---|---|---|
| 1,794,803 | * | 3/1931 | Stephens .......................... 248/292.13 |
| 3,457,006 | * | 7/1969 | Brown et al. ......................... 352/132 |
| 4,824,159 | * | 4/1989 | Fluharty et al. ..................... 296/37.7 |
| 5,096,271 | | 3/1992 | Portman . |
| 5,374,104 | * | 12/1994 | Moore et al. ..................... 297/188.16 |
| 5,469,298 | * | 11/1995 | Suman et al. ......................... 359/630 |
| 5,713,105 | * | 2/1998 | Toomey ................................. 16/245 |
| 5,775,762 | * | 7/1998 | Vitito .................................. 296/37.7 |
| 5,887,929 | * | 3/1999 | Miller et al. ......................... 296/37.8 |
| 5,918,956 | * | 7/1999 | Scholder .......................... 312/223.2 |
| 5,992,809 | * | 11/1999 | Sweere et al. ..................... 248/278.1 |
| 6,019,332 | * | 2/2000 | Sweere et al. ..................... 248/284.1 |
| 6,053,410 | * | 4/2000 | Wike, Jr. et al. ................ 235/462.43 |
| 6,115,086 | * | 9/2000 | Rosen .................................. 348/837 |

FOREIGN PATENT DOCUMENTS 4118711    12/1992   (DE) .

* cited by examiner

Primary Examiner—Anita M. King
Assistant Examiner—N. Sanders
(74) Attorney, Agent, or Firm—Frommer Lawrence & Haug, LLP.; William S. Frommer; Matthew K. Ryan

(57) ABSTRACT

A display assembly consists of a display and a mount for positioning the display in a vehicle including front and back seats and a top panel. The mount includes a first shell attached to the ceiling of the vehicle and a second shell connected with the flat panel display. The first and second shells are hinged, thus allowing the second shell to move between a first position where the display is in the first shell and a second position where the screen of the display can be watched by any passenger on a back seat.

26 Claims, 4 Drawing Sheets

FLAT-PANEL DISPLAY ASSEMBLY MOUNTABLE IN A VEHICLE

FIELD OF INVENTION

This invention is directed to a flat-panel display assembly mountable in a vehicle and, more particularly, to a mount for a flat-panel display in a vehicle and, more particularly, to a mount for securing a flat-panel display to the ceiling of a vehicle.

RELATED PRIOR ART

Conventionally, when used in a car, a television set is located near the driver's seat. Such an arrangement entails some drawbacks. Firstly, the television set may interrupt the driver's sight to the right front corner of the vehicle. Secondly, the television set may hinder the driver's movement. Finally, it is difficult for any passenger sitting on the back seat to watch the screen of the television.

Referring to FIG. 6, another conventional arrangement for positioning a flat-panel display in a vehicle is shown. In this arrangement, there are a base and a flexible "goose-neck" connector. The "goose-neck" connector is used to connect the base with a flat-panel display. The base is secured to the interior of a vehicle by any appropriate means (not shown).

Referring to FIG. 7, another conventional arrangement for positioning a flat-panel display in a vehicle is shown. In this arrangement, the flat-panel display is attached to a back of a seat for displaying information to any passenger sitting on a rear seat. The flat-panel display can be moved between an idle position and a working position for providing an adequate angle of view to the passenger sitting on the rear seat.

Referring to FIG. 8, another conventional arrangement for positioning a flat-panel display in a vehicle is shown. The flat-panel display is attached to a ceiling of a vehicle. The flat-panel display can be pivoted forwards from an idle position to a working position. In the idle position, a screen of the flat-panel display is concealed by means of a shell of the flat-panel display. In this position, the flat-panel display is substantially parallel to the ceiling of the vehicle, thus avoiding hindering of the passenger. In the working position, the screen of the flat-panel display can be watched by a passenger. In this position, the flat-panel display is at an angle from the ceiling of the vehicle. From the working position to the idle position, the flat-panel display must be pivoted in a direction towards the passenger, as indicated via an arrow. When the vehicle is suddenly stopped, due to inertia, the passenger may be thrown forward so as to hit the display and thus get hurt.

SUMMARY OF INVENTION

It is an objective of this invention to provide a flat-panel display assembly mountable in a vehicle without interrupting a driver's sight to the front of the vehicle.

It is another objective of this invention to provide a flat-panel display assembly mountable in a vehicle without hindering a driver's movement.

It is another objective of this invention to provide a flat-panel display assembly mountable in a vehicle so that any passenger sitting on a back seat of the vehicle can watch a screen of the display It is another objective of this invention to provide a flat-panel display assembly mountable in a vehicle without entailing the risk of hurting a passenger in a suddenly stopped vehicle.

BRIEF DESCRIPTION OF THE DRAWINGS

The preferred embodiment of this invention will be described and conventional vehicle-used displays have been described referring to the drawings in which.

DETAILED DESCRIPTION OF THE PREFERRED EMBODIMENT

Figure 1:
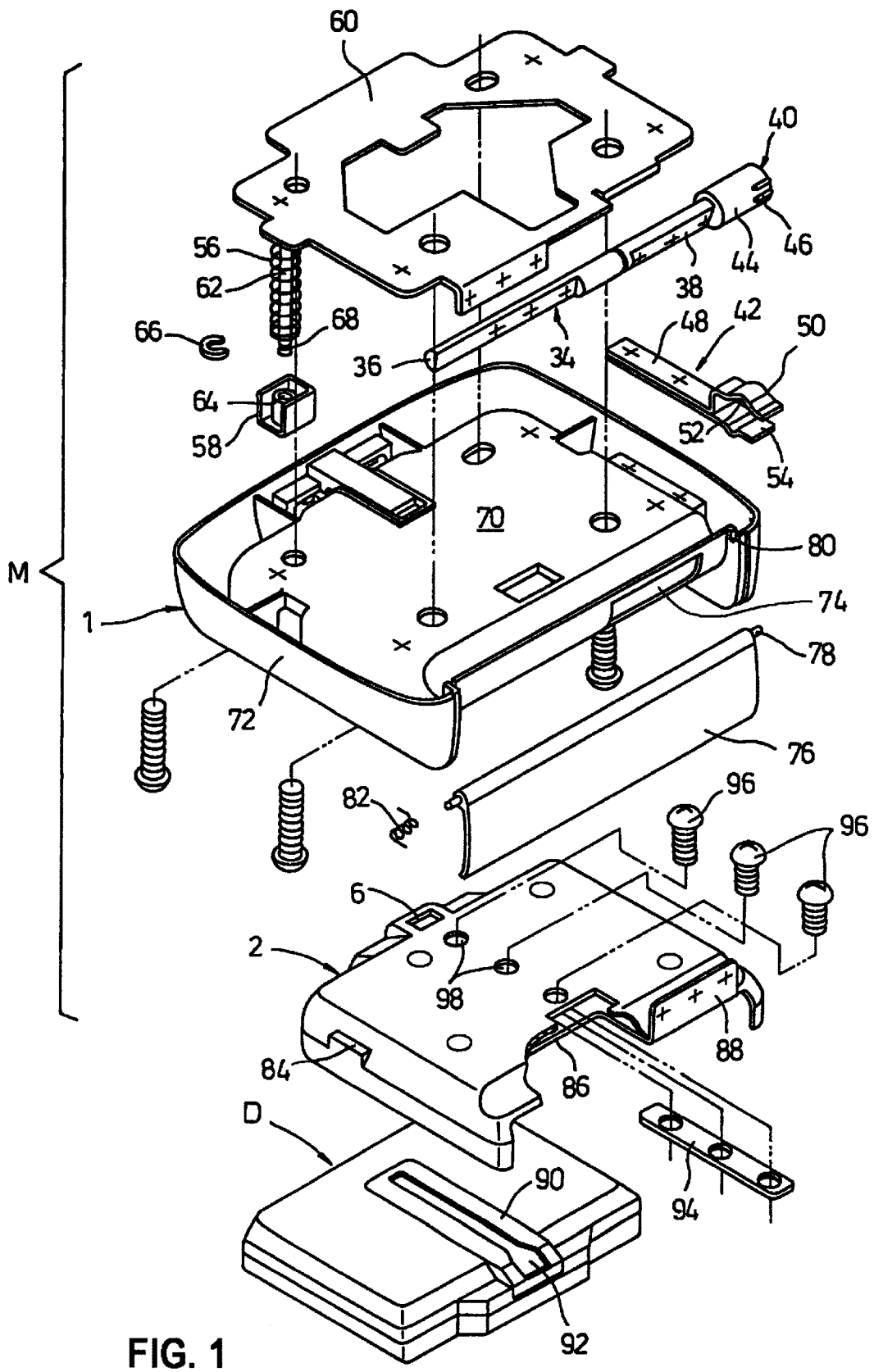
FIG. 1 is an exploded view of a mount for a display in a vehicle according to the preferred embodiment of this invention.

Referring to FIG. 1, there is shown a flat-panel display assembly mountable in a vehicle such as an automobile, an aircraft, a train and the like. The flat-panel display assembly consists of a flat-panel display D and a mount M via which the flat-panel display D can be secured to the interior of a vehicle including front and back seats and, preferably, a roof panel. It is convenient for any passenger sitting on the back seat to watch the screen of the flat-panel display D. The flat-panel display D may be connected with a television receiver or a portable computer.

Figure 5:
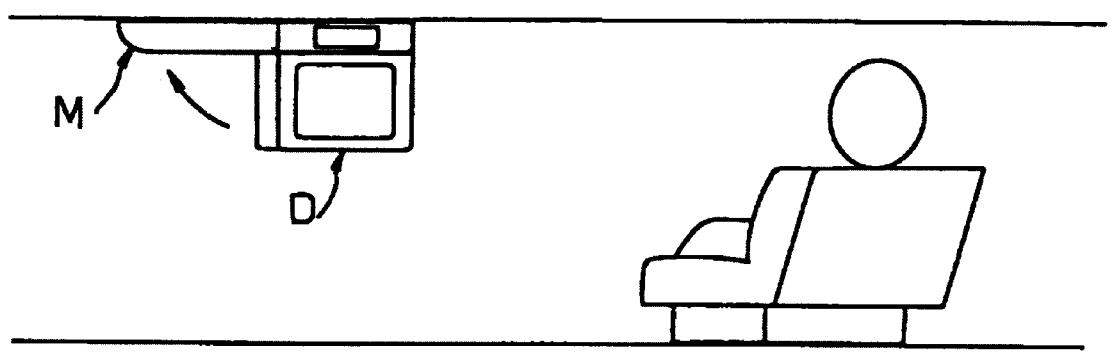
FIG. 5 is a perspective view of the mount in a second position.
Figure 4:
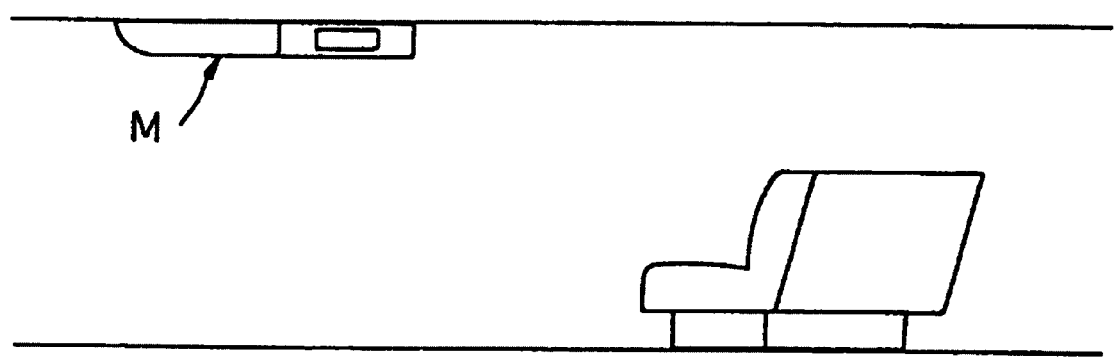
FIG. 4 is a perspective view of the mount in a first position.
Figure 6:
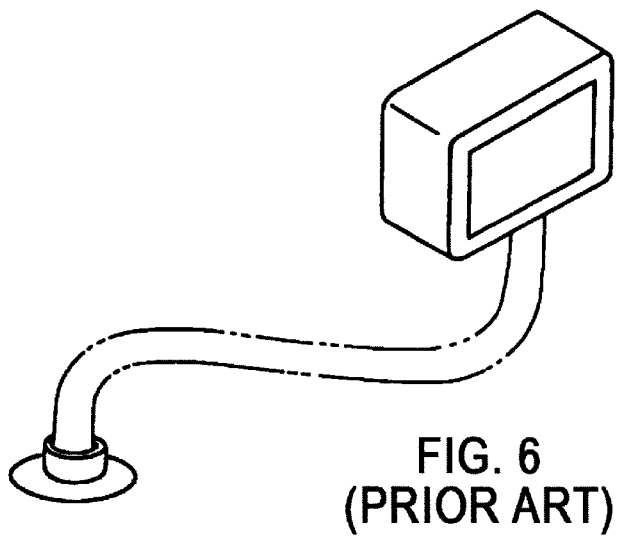
FIG. 6 is a perspective view of a flat panel display connected with a goose neck type mount according to the prior art.
Figure 7:
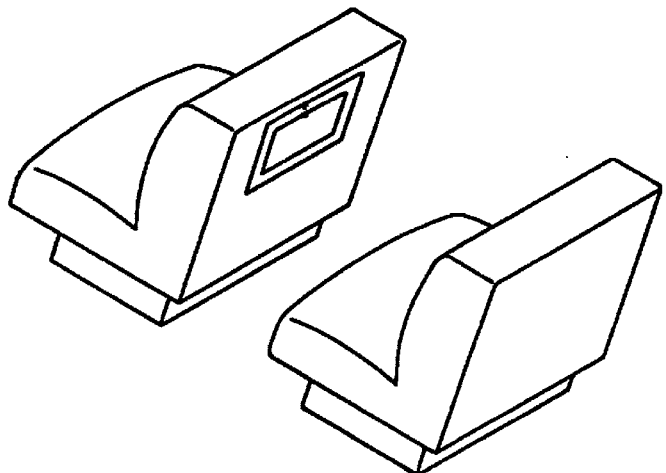
FIG. 7 is a perspective view of a flat panel display embedded in a seatback according to the prior art.
Figure 8:
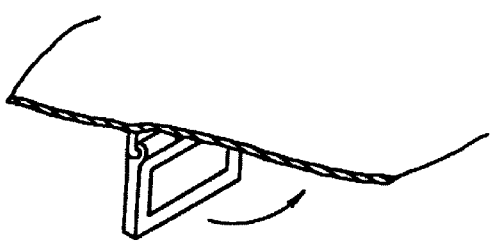
FIG. 8 is a perspective view of a flat panel display secured to a vehicle ceiling according to the prior art.
Figure 8:
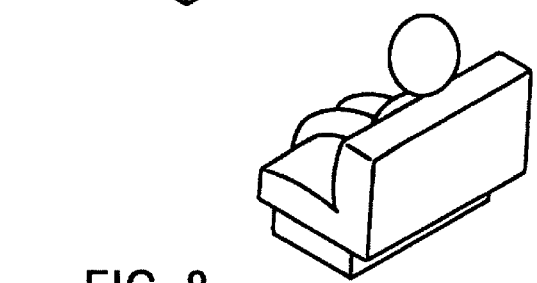

The mount M includes a first shell 1 and a second shell 2 connected with the first shell 1 in a pivotal manner. The first shell 1 is secured to the interior in front of the back seat. In the preferred embodiment, the first shell 1 is secured to the ceiling of the vehicle, however, in another embodiment, the first shell 1 can be attached to the floor panel of the vehicle between the driver's seat and the front passenger's seat. The flat-panel display D is secured to the second shell 2. The second shell 2 can be pivoted in a rearward direction from a first position (see FIG. 4) to a second position (see FIG. 5). In the first position, the second shell 2 is in the first shell 1, thus concealing the flat-panel display D from any passenger sitting on the back seat of the vehicle. In the second position, the screen of the flat-panel display D is visible by any passenger sitting on the back seat of the vehicle. When the car is suddenly stopped, the flat-panel display D is pivoted from the second position to the first position in a forward direction, thus avoiding the risk of hitting any passenger sitting on the back seat.

The mount M includes a device for retaining the second shell 2 in the first position. The retaining device includes a catch 4 attached to the first shell 1 for engagement with the second shell 2 in the first position.

Figure 2:
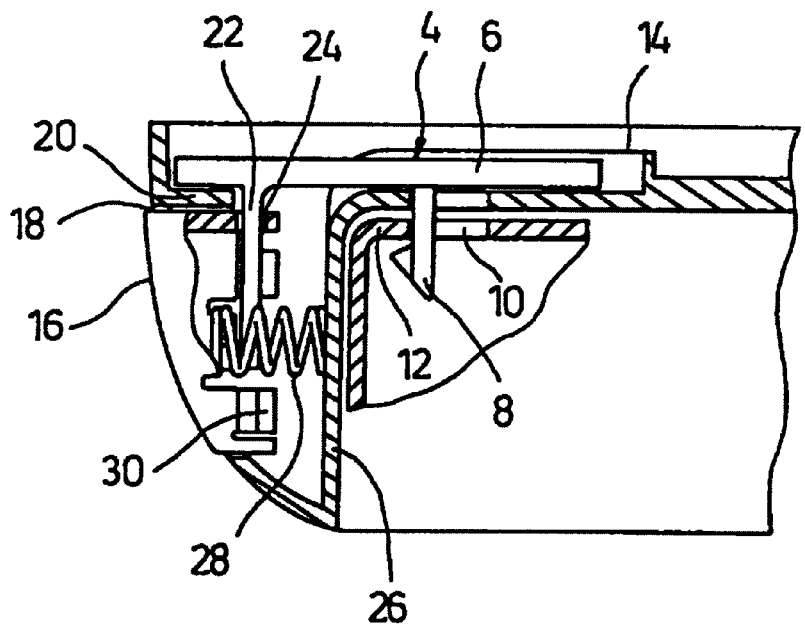
FIG. 2 is a partial cross-sectional view of a first shell (1) used in the mount shown in FIG. 1.

Referring to FIG. 2, the catch 4 includes a slide 6 and a hook 8 projecting from the slide 6 in a perpendicular manner. The slide 6 is located on the first shell 1 by inserting the hook 8 through a slot 10 defined in the first shell 1. The slide 6 is moved between a catching position and a releasing position while the hook 8 is moved in the slot 10. In the catching position, the hook 8 is engaged with an edge 12 about the slot 10. In the preferred embodiment, the slide 6 is located within a guide 14 in the form of a frame formed the first shell 1, thus ensuring smooth movement of the slide 6.

Figure 3:
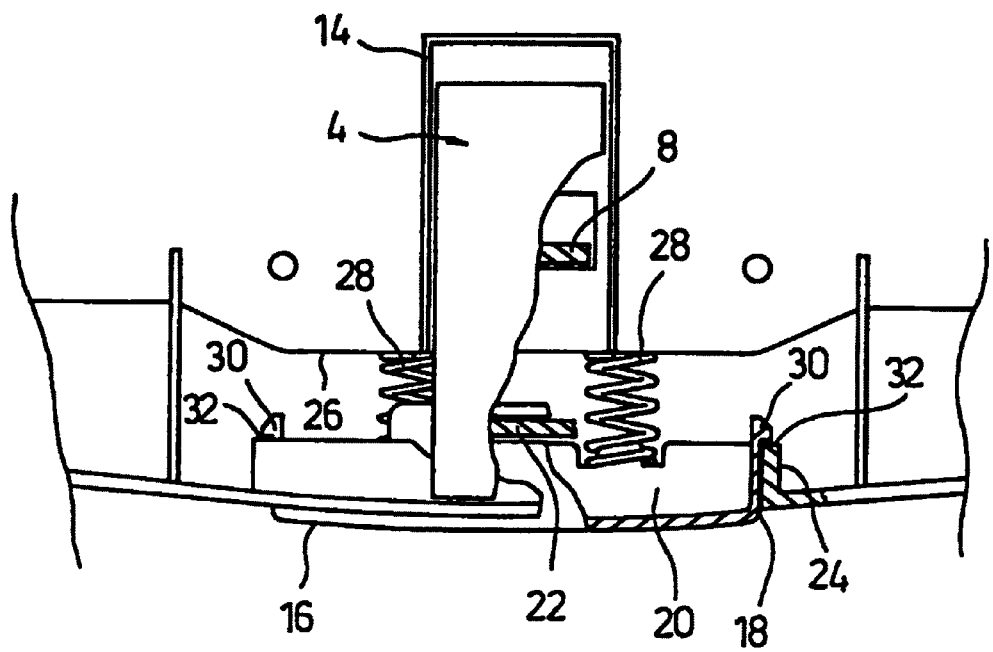
FIG. 3 is another partial cross-sectional view of the first shell (1) shown in FIG. 2.

The mount M further includes a device for moving the catch 4 from the catching position to the releasing position. The catch-moving device includes a button 16 engaged with the catch 4. The button 16 is received in an aperture 18 defined in the first shell 1 in a sliding manner. A periphery 20 (see FIG. 3) is formed about the aperture 18 to ensure smooth movement of the button 16. The catch-moving device includes a protrusion 22 from the slide 6 and a protrusion-receiving hole 24 in the button 16. The engagement of the catch 4 with the button 16 is achieved by insertion of the protrusion 22 in the protrusion-receiving hole 24. Thus, the catch 4 can be moved from the catching position to the releasing position by exerting a pushing force on the button 16. At least one elastic element is compressed between the button 16 and a wall 26 formed on the first shell 1. Thus, the button 16 can be returned to its original position after it is released from the bushing force. In the preferred embodiment shown in the drawings, there are two elastic elements both in the form of a spring 28. Referring to FIG. 3, the button 16 includes at least one snap 30 projecting therefrom for engagement with the free edge 32 of the periphery 20, thus avoiding disengagement of the button 16 from the first shell 1. In the shown embodiment, there are two snaps 30. In an assembled position, the protrusion 22 is located between the springs 28 located between the snaps 30.

The pivotal connection of the first shell 1 with the second shell 2 is achieved by means of a hinge 34 connected between the shells 1 and 2. The hinge 34 consists of a first portion 36 and a second portion 38 connected with the first portion 36 in a rotational manner. The first portion 36 is secured to the first shell 1 and the second 38 portion is secured to the second shell 2. Thus, the second shell 2 can be pivoted relative to the first shell 1. However, the second shell 2 can be retained in any position relative to the first shell 1 if not subjected to any torque except the one due to the weight thereof.

The mount M further includes a second retaining device for retaining the second portion 38 in a position corresponding to the second position of the second shell 2. The second retaining device includes a ribbed element 40 secured to the second portion 38 and a holder 42 secured to the second shell 2. The ribbed element 40 includes a cap 44 and at least one rib 46 formed on the cap 44. The second portion 38 is inserted in the cap 44. The holder 42 includes an arm 48 secured to the second shell 2 and a finger 50 in contact with the cap 44. The finger 50 includes a recess 52 for receiving the rib 46 when the second shell 2 is in the second position relative to the first shell 1. The second shell 2 can be moved from the second position relative to the first shell 1 as the rib 46 can be moved from the recess 52 due to elasticity of the finger 50. In the shown embodiment, the holder includes a second finger 54 so that the cap 44 is located between the fingers 50 and 54.

The mount M further includes a device for pushing the second shell 2 from the first position when it is released from the first retaining device. The pushing device may be a spring-biased type including a spring 56 secured to the first shell 1 and a block 58 secured to the free end of the spring 56. In the shown embodiment, there are two spring-and-block combinations and, instead of being attached to the first shell 1, they are attached to a metal plate 60 attached to the first shell 1. The metal plate 60 is used to enforce the first shell 1. Preferably, a stem 62 is secured to the metal plate 60. The spring 56 is mounted on the stem 62 inserted in a stem-receiving hole 64 defined in the block 58, thus ensuring smooth movement of the block 58. Although not shown, the pushing device may be an elastic plastic block or an enclosure filled with pressurized air. There is a block-stopping device for stopping disengagement of the block 58 from the stem 62. The block-stopping device includes a C-ring 66 received in an annular groove 68 defined in the stem 62.

The first shell 1 includes a top 70 and a periphery 72 projecting from the top 70. The periphery 72 includes an opening 74 which can be sealed by means of a door 76 linked to the periphery 72 in a pivotal manner. The door 76 includes two shafts 78 projecting in opposite directions therefrom. Two shaft-receiving holes 80 (only one of them is shown in FIG. 1) are defined in the periphery 72 on opposite sides of the opening 74. Each of the shafts 78 is received in a corresponding one of the shaft-receiving holes 80. A torque spring 82 is mounted on one of the shafts 78 and includes an end secured to the periphery 72 and an opposite end secured to the door 76. Thus, the opening 74 is closed by means of the door 76 when no external force is exerted on the door 76.

The second shell 2 includes two ears 84 (only one of them is shown in FIG. 1) formed on two opposite sides thereof for engagement with the blocks 58. In the shown embodiment, instead of being connected with the second shell 2, the second portion 38 of the hinge 34 is connected with a second metal plate 86 connected with the second shell 2. The second metal plate 86 is used to enforce the second shell 2. Particularly, the second portion 38 is connected with a tab 88 projecting from the second metal plate 86 in a right angle.

A third metal plate 90 is attached to the flat-panel display D. The third metal plate 90 includes a straight portion and an angled portion. The third metal plate 90 includes a slot 92 defined therein. The slot 92 includes an enlarged end in the angled portion of the third metal plate 90. Thus, a fourth metal plate 94 can be located between the second shell 2 and the flat-panel display through the enlarged end of the slot 92. A plurality of threaded bolts 96 are inserted through a corresponding number of apertures 98 defined in the second shell 2 and a corresponding number of apertures (not shown) defined in the third metal plate 86. The threaded bolts 96 are engaged with threaded walls of a corresponding of holes 98 defined in the fourth plate 94. Thus, the second shell 2 is connected with the flat-panel display D.

What is claimed is:

1. A display assembly mountable in a vehicle, the vehicle comprising a display assembly comprising a display, a mount including first and second shells for securing the display to the interior of the vehicle, a hinge connected between the first and second shells wherein the hinge includes a first portion rotatably connected with the first shell and a second portion rotatable connected with the second shell, and a device for retaining the second shell in the first position wherein the retaining device includes a catch attached to the first shell and an edge formed on the second shell and the catch can be engaged with the edge in the first position wherein the catch can be moved between a position for catching the edge and another position for releasing the edge, said retaining device further including a device for moving the catch between the catching and releasing positions wherein the catch-moving device is a button connected with the catch and attached to the first shell so that the button moves the catch while sliding on the first shell and wherein the first shell includes an aperture therein for receiving the button, said catch-moving device including at least one snap projecting from the button for engagement with the edge of the aperture thus avoiding disengagement of the button from the first shell.

2. A display assembly mountable in a vehicle, the vehicle comprising a display assembly comprising a display, a mount including first and second shells for securing the display to the interior of the vehicle, a hinge connected between the first and second shells wherein the hinge includes a first portion rotatably connected with the first shell and a second portion rotatable connected with the second shell, and a device for retaining the second shell in the first position wherein the retaining device includes a catch attached to the first shell and an edge formed on the second shell and the catch can be engaged with the edge in the first position wherein the catch can be moved between a position for catching the edge and another position for releasing the edge, said retaining device further including a device for moving the catch between the catching and releasing positions wherein the catch-moving device is a button connected with the catch and attached to the first shell so that the button moves the catch while sliding on the first shell and wherein the first shell includes an aperture therein for receiving the button, said catch-moving device including a wall formed on the first shell near the aperture and at least one elastic element compressed between the button and the plate.

3. The display assembly according to claim 2 wherein the at least one elastic element is a spring.

4. A display assembly mountable in a vehicle, the vehicle comprising a display assembly comprising a display, a mount including first and second shells for securing the display to the interior of the vehicle, a hinge connected between the first and second shells wherein the hinge includes a first portion rotatably connected with the first shell and a second portion rotatably connected with the second shell, and a device for retaining the second shell in the first position wherein the retaining device includes a catch attached to the first shell and an edge formed on the second shell and the catch can be engaged with the edge in the first position wherein the catch can be moved between a position for catching the edge and another position for releasing the edge, wherein the catch includes a slide and a hook projecting from the slide, and the slide can slide on the first shell between the catching position and the releasing position.

5. The display assembly according to claim 4 wherein the hook is engaged with the edge in the catching position and disengaged from the edge in the releasing position.

6. A display assembly mountable in a vehicle, the vehicle comprising a display assembly comprising a display, a mount including first and second shells for securing the display to the interior of the vehicle, a hinge connected between the first and second shells wherein the hinge includes a first portion rotatably connected with the first shell and a second portion rotatable connected with the second shell, and a device for retaining the second shell in the first position wherein the retaining device includes a catch attached to the first shell and an edge formed on the second shell and the catch can be engaged with the edge in the first position wherein the catch can be moved between a position for catching the edge and another position for releasing the edge, said retaining device further including a device for moving the catch between the catching and releasing positions wherein the catch-moving device is a button connected with the catch and attached to the first shell so that the button moves the catch while sliding on the first shell and wherein the catch includes a protrusion from the edge and the button includes a protrusion-receiving aperture therein so that the protrusion is inserted in the protrusion-receiving aperture thus connecting the catch with the button.

7. A display assembly mountable in a vehicle, the display assembly comprising a display, a mount including first and second shells for securing the display to the interior of the vehicle, and a hinge connected between the first and second shells wherein the hinge includes a first portion rotatably connected with the first shell and a second portion rotatably connected with the second shell and wherein the second portion of the hinge can be rotated relative to the first portion of the hinge by a sufficient torque and can be retained in position when no sufficient torque is exerted thereon.

8. The display assembly according to claim 7 wherein the first shell includes a top and a periphery projecting from the top, the periphery including an opening defined therein for allowing the movement of the second shell from the first position to the second position.

9. The display assembly according to claim 8 including a door connected with the periphery for closing the opening.

10. The display assembly according to claim 9 including a spring connected between the periphery and the door for biasing the door to close the opening.

11. The display assembly according to claim 7, wherein the first shell is attached to the vehicle, and the second shell is connected with the display, thus allowing the display to move between a first position in the first shell and a second position where a passenger sitting on a back seat of the vehicle can watch a screen of the display.

12. The display assembly according to claim 7, wherein the display is in the form of a flat panel display.

13. The display assembly of claim 7 wherein the first shell is secured to the ceiling of the vehicle and the second shell is pivoted from the second position to the first position in a forward direction.

14. A display assembly mountable in a vehicle, the display assembly comprising a display, a mount including first and second shells for securing the display to the interior of the vehicle, and a hinge connected between the first and second shells wherein the hinge includes a first portion rotatable connected with the first shell and a second portion rotatably connected with the second shell and further including a retaining device for retaining the second portion of the hinge in a position corresponding to the second position of the second shell.

15. The display assembly according to claim 14 wherein the second retaining device includes a holder secured to the first shell and a rib formed on the second portion of the hinge and the holder an be engaged with the rib.

16. The display assembly according to claim 15 wherein the holder includes an arm secured to the first shell and a finger projecting from the arm and including a recess for receiving the rib.

17. The display assembly according to claim 15 wherein the holder includes two fingers between which the second portion of the hinge is located.

18. A display assembly mountable in a vehicle, the display assembly comprising a display, a mount including first and second shells for securing the display to the interior of the vehicle, a hinge connected between the first and second shells wherein the hinge includes a first portion rotatably connected with the first shell and a second portion rotatably connected with the second shell, a device for retaining the second shell in the first position, and a device for pushing the second shell from the first position when the first shell is released from the retaining device wherein the pushing device includes at least one elastic element which is a spring-biased block compressed between the first and second shells in the first position of the second shell.

19. A display assembly mountable in a vehicle, the display assembly comprising a display, a mount including first and second shells for securing the display to the interior of the vehicle, a hinge connected between the first and second shells wherein the hinge includes a first portion rotatably connected with the first shell and a second portion rotatably connected with the second shell, a device for retaining the second shell in the first position, and a device for pushing the second shell from the first position when the first shell is released from the retaining device wherein the pushing device includes at least one elastic element which includes a spring attached to the first shell and a block attached to the spring and the block is in contact with the second shell in the second position.

20. The display assembly according to claim 19 wherein the elastic element includes a stem projecting from the first shell through the spring and a stem-receiving aperture in the block thus ensuring smooth movement of the block.

21. The display assembly according to claim 20 wherein the elastic element includes a device for retraining the block on the stem.

22. The display assembly according to claim 21 wherein the block-retaining device includes an annular groove defined in the stem and a C-ring received in the annular groove for stopping the block.

23. A display assembly mountable in a vehicle having an interior including a back seat, the display assembly comprising a display having a screen; a mount including first and second shells for securing the display to the interior of the vehicle wherein the first shell is attached to the vehicle and the second shell is connected with the display thus allowing the display to be movable between a first position in the first shell and a second position where a passenger in the back seat of the vehicle can watch the screen of the display; and a device for retaining the second shell in the first position wherein the retaining device includes a catch attached to the first shell and an edge formed on the second shell and the catch can be engaged with the edge in the first position and wherein the catch can be moved between a position for catching the edge and a position for releasing the edge, said retaining device further including a device for moving the catch between the catching and releasing positions which comprises a button connected with the catch and attached to the first shell so that said button moves the catch while sliding on the first shell, said first shell further including an aperture for receiving the button and said catch-moving device includes at least one snap projecting from the button for engagement with the edge of the aperture thus avoiding disengagement of the button from the first shell.

24. A display assembly mountable in a vehicle having an interior including a back seat, the display assembly comprising a display having a screen; a mount including first and second shells for securing the display to the interior of the vehicle wherein the first shell is attached to the vehicle and the second shell is connected with the display thus allowing the display to be movable between a first position in the first shell and a second position where a passenger in the back seat of the vehicle can watch the screen of the display; and a device for retaining the second shell in the first position wherein the retaining device includes a catch attached to the first shell and an edge formed on the second shell and the catch can be engaged with the edge in the first position and wherein the catch can be moved between a position for catching the edge and a position for releasing the edge, said retaining device further including a device for moving the catch between the catching and releasing positions which comprises a button connected with the catch and attached to the first shell so that said button moves the catch while sliding on the first shell, said first shell further including an aperture for receiving the button, and said catch-moving device further including a wall formed on the first shell near the aperture and at least one elastic element compressed between the button and the wall.

25. A display assembly mountable in a vehicle having an interior including a back seat, the display assembly comprising a display having a screen; a mount including first and second shells for securing the display to the interior of the vehicle wherein the first shell is attached to the vehicle and the second shell is connected with the display thus allowing the display to be movable between a first position in the first shell and a second position where a passenger in the back seat of the vehicle can watch the screen of the display; and a device for retaining the second shell in the first position wherein the retaining device includes a catch attached to the first shell and an edge formed on the second shell and the catch can be engaged with the edge in the first position and wherein the catch can be moved between a position for catching the edge and a position for releasing the edge, and wherein the catch includes a slide and a hook projecting from the slide so that the slide can slide on the first shell between the catching position and the releasing position.

26. A display assembly mountable in a vehicle having an interior including a back seat, the display assembly comprising a display having a screen; a mount including first and second shells for securing the display to the interior of the vehicle wherein the first shell is attached to the vehicle and the second shell is connected with the display thus allowing the display to be movable between a first position in the first shell and a second position where a passenger in the back seat of the vehicle can watch the screen of the display; and a device for retaining the second shell in the first position wherein the retaining device includes a catch attached to the first shell and an edge formed on the second shell and the catch can be engaged with the edge in the first position and wherein the catch can be moved between a position for catching the edge and a position for releasing the edge, said retaining device further including a device for moving the catch between the catching and releasing positions which comprises a button connected with the catch and attached to the first shell so that said button moves the catch while sliding on the first shell, and wherein the catch includes a protrusion from the edge and the button includes a protrusion-receiving aperture therein so that the protrusion is inserted in the protrusion-receiving aperture thus connecting the catch with the button.

* * * * *